United States Patent

Somerset

[15] 3,655,972
[45] Apr. 11, 1972

[54] CASSETTE

[72] Inventor: James H. Somerset, 140 Humbert Avenue, Syracuse, N.Y. 13224

[22] Filed: Nov. 26, 1969

[21] Appl. No.: 880,346

[52] U.S. Cl. ..............................250/67, 250/68, 313/108 D
[51] Int. Cl. .........................................................H05g 1/28
[58] Field of Search ...............................................250/67, 68

[56] References Cited

UNITED STATES PATENTS 3,452,196  6/1969  Gray ..........................................250/67
3,488,753  1/1970  Tone et al ..................................250/67

*Primary Examiner*—James W. Lawrence
*Assistant Examiner*—C. E. Church
*Attorney*—Pennie, Edmonds, Morton, Taylor and Adams

[57] ABSTRACT

This invention relates to a cassette for taking and identifying X-ray radiographs comprising means defining an access slot in the cassette, a film identification chamber in a portion of the cassette communicating with said slot, electroluminescent means in said chamber capable of emitting visible light upon electrical excitation, and means to provide electrical connection between the electroluminescent means and means for supplying electrical excitation.

4 Claims, 5 Drawing Figures

PATENTED APR 11 1972  3,655,972
FIG.1. FIG.2. FIG.3.
FIG.4. FIG.5.
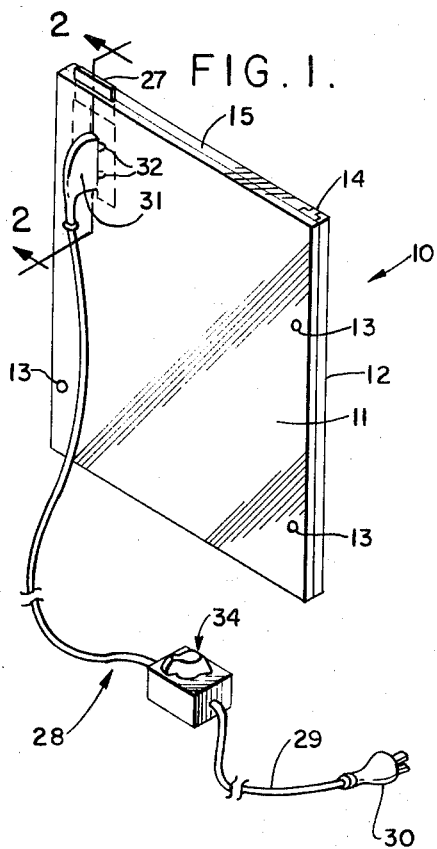
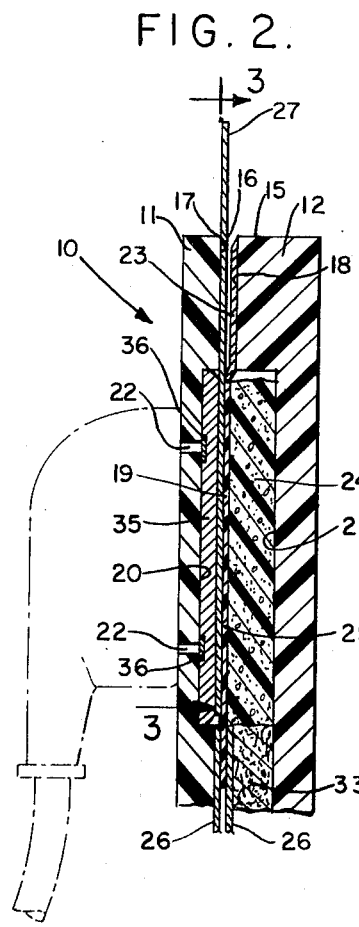
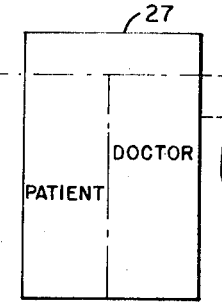
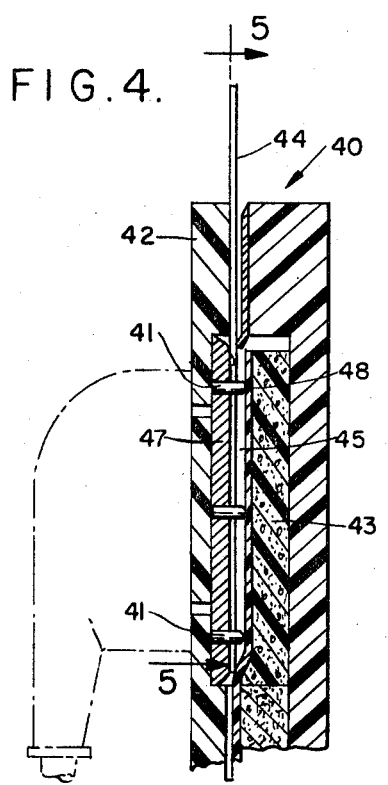
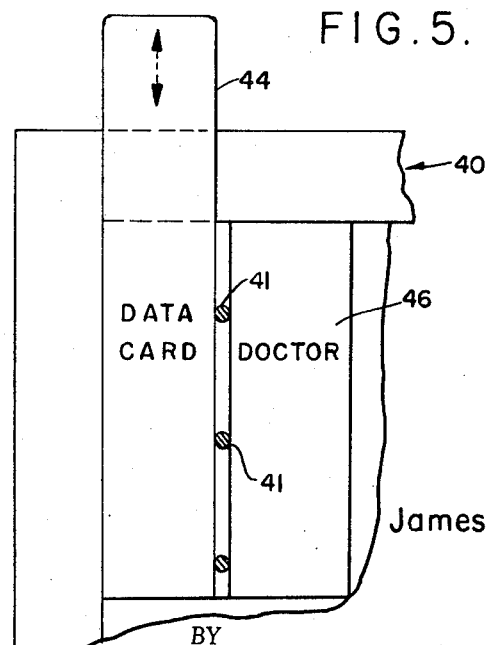
INVENTOR
James H. Somerset
BY
Pennie, Edmonds, Morton, Taylor & Adams
ATTORNEYS

CASSETTE

BACKGROUND OF THE INVENTION

It has long been desired to have a simple positive means of marking X-ray films and plates so as to record identifying data thereon. Heretofore, incident X-rays and external marker systems have been utilized for this purpose, but have proven unsuitable. In the case of the use of incident X-rays, the identification is sometimes blackened beyond recognition when high voltages are used as in making X-ray radiographs of thick parts of the human anatomy. This is due to the excess amount of actinic rays produced by the fluorescent screens subjected to the high voltage. On the other hand, if low voltage or a collimated X-ray beam is used, there is little radiation available at the data location site and the identification is not distinct. In both cases, the intensity of the incident radiation is directly related to the requirements of the object being X-rayed, not upon the data marking criteria. In addition, the use of incident radiation often results in superimposing of the object being X-rayed upon the data and the resulting "double image" in many cases is confusing and renders the data illegible.

External marking systems have also been used and in the most commonly used type, film is removed from the cassette in a dark room and the film placed in a special marking device together with a data card. Illuminating the card results in imposing the image of the card on the film. Because the film must be handled under dark room conditions, the process of removal from the cassette and of insertion into the marker is likely to result in artifacts, or imperfections, in the resulting radiograph. Moreover, since the marking is done as a separate process, remote from the patient, the wrong data may be imposed on a film, with possible serious consequences. This method is also inefficient in its waste of time.

SUMMARY OF THE INVENTION

A new cassette has been developed which provides for a positive marking of X-ray radiographs for identification and which does not require incident X-ray, and does not require removal of the film from the cassette for the purpose of identification.

Briefly stated, the present invention comprises a cassette for taking and identifying X-ray radiographs comprising means defining an access slot in the cassette, a film-identification chamber in a portion of the cassette communicating with said slot, electroluminescent means in said chamber capable of emitting visible light upon electrical excitation, and means to provide electrical contact between the electroluminescent means and means for supplying electrical excitation.

BRIEF DESCRIPTION OF THE DRAWINGS

FIG. 1 is a perspective view of a cassette of the present invention with the film-identification portion shown in dotted line;

FIG. 2 is a vertical fragmentary sectional view taken along line 2—2 of FIG. 1;

FIG. 3 is a front elevational view of the data card taken along line 3—3 of FIG. 2;

FIG. 4 is a vertical fragmentary sectional view of a modified version of the invention; and FIG. 5 is a front elevational view of the data card taken along line 5—5 of FIG. 4.

DETAILED DESCRIPTION

Referring to FIGS. 1 to 3, there is shown a cassette 10 comprising a front wall 11, back wall 12, and means for locking the front and back walls together. The front wall 11 is the one exposed to the X-rays and permits their passage therethrough whereas the back wall is provided with the usual shielding materials 33 to diminish the amount of X-radiation passing therethrough. In the embodiment shown, latches 13 are used and latch releases 14 provided which, upon depression, will permit separation of the front wall 11 and back wall 12 for insertion of new X-ray films or plates after removal of the exposed films or plates. The front and back walls may be held together by other conventional locking means, as by screws, and may even be hinged as is conventional with X-ray cassettes. It is not necessary for the purpose of the instant invention that there be two separable walls to the cassette.

A side 15 of the cassette is provided with an access slot 16, formed by complementary recesses 17 and 18 in the front and back walls. Alternatively, the access slot can be exclusively in the front or back walls. The slot 16 is in communication with a film-identification chamber 19, formed by further complementary recesses 20 and 21 in one corner of the walls. As in the case of the access slot, the chamber may be entirely in the front or back wall.

Attached to the front wall 11, as by use of an adhesive, is an electroluminescent screen 35 having contact plates 36 attached thereto. The contact plates 36, in turn, can be reached from the exterior of the cassette 10 through openings 22 in the front wall 11 of the cassette. The contact plates may also be reached through openings placed in the side wall of the cassette instead of the front or back wall.

The access slot 16 is provided with a light shield, in this case a flexible metal plate 23, which in its normal position closes the slot 16 so as to prevent light from penetrating into the chamber 19. Other means, such as foam rubber, can be used for this purpose, as can the black felted fabric means described in U.S. Pat. No. 3,296,437. As hereinafter described, the metal plate 23, or the resilient means 24, or both, also act as a guide for data cards inserted into the chamber 19.

The bottom portion of the chamber is provided with resilient means 24, preferably foam rubber. In the embodiment of the cassette illustrated, an X-ray film 25 is shown interposed between two fluorescent screens 26. Such fluorescent screens are commonly used in X-ray cassettes for image enhancement, although it will be understood that the instant invention does not require the use of such fluorescent screens. If used, the portion of each such screen immediately overlapping the electroluminescent screen is removed or blocked out. A data card 27, with identification thereon, such as the names of the patient and doctor, the date, and other data, is shown inserted through the slot 16 and into the chamber 19.

Although not a part of this invention, there is shown means 28 for supplying electrical excitation to the electroluminescent screen 35. These means comprise a cord 29 having one end 30 adapted for insertion into an electrical outlet and the end 31 provided with electrical contact pins 32 which fit through openings 22 in the cassette and come into contact with contact plates 36 on the electroluminescent screen 35. For reasons hereinafter set forth, a voltage regulator 34 is also provided.

While the electroluminescent screen 35, openings 22, and contact plates 36 have been shown as being present in the front wall 11 of the cassette, they can be in the back wall 12. All that is required, if such reversal is made, is that a material opaque to X-rays of a size coextensive with the electroluminescent screen be included in the front wall to prevent exposure of the X-ray film or plate in that portion of the cassette when the X-ray radiograph is being taken. Although the location of the marking chamber has been shown in a corner of the cassette, it can be located anywhere around the periphery of the cassette.

In the modification of the device shown in FIGS. 4 and 5, a cassette 40 is provided with projections 41 attached to the front wall 42 of the cassette or mounted on the electroluminescent screen. These act to depress an X-ray film 41 against resilient means 43. This permits the data card 44 to be inserted more readily into the chamber 45. A further feature, shown best in FIG. 5, is the use of a permanent legend 46 printed onto a portion of the electroluminescent screen 47. The illustration is that of the particular doctor, although the name of the X-ray department and/or hospital could be used. Thus, in a large X-ray department where films are received from many sources, such as other X-ray departments, this could be a further means for identifying a film should for some reason the film not be marked with a data card.

As to materials, the walls of the cassette can be made of any of the usual plastics and/or metals presently used for this purpose. The electroluminescent screen can be made of any of the commercially available electroluminescent sheets which give off visible light upon excitation by voltage. In place of the electroluminescent screen, there can be used small incandescent bulbs, neon bulbs, or other gas-filled bulbs capable of emitting visible light. Such materials are often opaque to X-rays, but if one particular type is not an X-ray opaque material, a layer of opaque material may be inserted between the front wall 11 and the electroluminescent screen shown in FIGS. 1-3 to prevent exposure of the X-ray film. The data card may be of any type of material upon which information can be affixed, but is preferably of paper.

The operation of the cassette will be largely evident from the description already given. Either before or after the X-ray radiograph is taken, the data card 27, with the necessary identifying information written or typed thereon, is placed through the access slot 16 into the chamber 19. The metal plate 23 acts to guide it between the electroluminescent screen 35 and X-ray film 25. The cord 39 is plugged into an electric outlet and the contact pins 32 are inserted into the openings 22 to contact the contact plates 36. The resultant voltage passes into the electroluminescent screen 35 and causes it to glow and to give off visible light. This light acts to impose the data on the date card 27 onto the X-ray film 25. A voltage regulator is required only to allow for adjustment of voltage for best exposure should various types of X-ray films and/or electroluminescent screens be used. For example, while 25 volts may be required for the best exposure of a given type of X-ray film, it may be inadequate or too much for another type of film.

From the foregoing it is seen that no X-rays or darkrooms are required to mark the X-ray radiograph and that marking can be accomplished even before the X-ray radiograph is taken.

It will be understood that it is intended to cover all changes and modifications of the invention herein chosen for the purpose of illustration which do not constitute departures from the spirit and scope of the invention.

What is claimed is:

1. A cassette for taking and identifying X-ray radiographs comprising means defining an access slot in the cassette, a film-identification chamber in a portion of the cassette and communicating with said slot, electroluminescent means attached in said chamber and capable of emitting visible light upon electrical excitation and having affixed on a portion thereof an identification legend, a copy of which legend is marked on X-ray film in the cassette when the cassette is used, and means in said cassette to provide electrical connection between said electroluminescent means and means to supply electrical excitation.

2. The cassette of claim 1 including means in said access slot to prevent light from entering into said chamber.

3. The cassette of claim 2 wherein the electroluminescent means comprises an electroluminescent screen attached to one surface of the chamber and said means to provide electrical connection comprises at least one contact plate positioned between said screen and an opening extending to the exterior of said cassette.

4. A cassette for taking and identifying X-ray radiographs comprising front, back, and side walls, an access slot in a side of the cassette at a corner thereof, a film identification chamber in said corner of the cassette and communicating with said slot, an electroluminescent screen in said chamber and attached to the front wall, a portion of said screen having affixed thereto an identification legend a copy of which legend is marked on X-ray film in the cassette when the cassette is used, at least one contact plate attached to the screen and positioned between said screen and said front wall, at least one opening extending from the exterior of the cassette to said contact plate, and means in said access slot to prevent light from entering said chamber.

* * * * *